(12) United States Patent
Chen

(10) Patent No.: US 7,341,411 B2
(45) Date of Patent: Mar. 11, 2008

(54) TOOL HOLDER STRUCTURE

(75) Inventor: Peter Chen, Taoyuan County (TW)

(73) Assignee: Primetool Mfg, Inc., Jhongli (TW)

( * ) Notice: Subject to any disclaimer, the term of this patent is extended or adjusted under 35 U.S.C. 154(b) by 0 days.

(21) Appl. No.: 11/450,579

(22) Filed: Jun. 12, 2006

(65) Prior Publication Data

US 2007/0098513 A1 May 3, 2007

Related U.S. Application Data

(63) Continuation-in-part of application No. 11/263,905, filed on Nov. 2, 2005, now abandoned.

(51) Int. Cl.
*B23B 31/09* (2006.01)

(52) U.S. Cl. .................. 409/234; 408/239 R; 279/103

(58) Field of Classification Search ................ 409/234, 409/131, 232, 233, 141, 144; 408/239 A, 408/239 R, 143; 279/103, 158
See application file for complete search history.

(56) References Cited

U.S. PATENT DOCUMENTS

| | | | |
|---|---|---|---|
| 4,865,336 A * | 9/1989 | Keritsis | 409/234 |
| 5,167,478 A * | 12/1992 | Ramunas | 409/234 |
| 5,234,296 A * | 8/1993 | Presby et al. | 409/234 |
| 5,352,073 A | 10/1994 | Kitaguchi et al. | |
| 5,593,258 A * | 1/1997 | Matsumoto et al. | 409/234 |
| 6,071,219 A * | 6/2000 | Cook | 409/234 |
| 6,471,453 B1 * | 10/2002 | Winebrenner et al. | 409/141 |
| 6,739,810 B2 | 5/2004 | Komine et al. | |
| 6,905,278 B2 * | 6/2005 | Kress et al. | 409/234 |

OTHER PUBLICATIONS

ICTM standard—HSK Standard for turning mills (18 total pgs. including pp. 7-200.
Robert B. Aronson, Toolholder Primer, Manufacturing Engineering, May 1999, 3 pages.
Robert B. Aronson, Toolholder Primer, Manufacturing Engineering from LookSmart website May 1999, 3 pages.

* cited by examiner

*Primary Examiner*—Dana Ross
(74) *Attorney, Agent, or Firm*—Birch, Stewart, Kolasch & Birch, LLP

(57) ABSTRACT

A tool holder structure includes a holder installed on a connecting portion of a machine for holding a tool, the holder has a connecting cone for connecting the connecting portion, and a latching portion with an external diameter larger than the connecting cone disposed at the bottom of the connecting cone. The invention installs a ring between the latching portion and a surface of the connecting portion for pressing and connecting the connecting portion to define a tight engagement, so that the holder can be connected to a machine by the connecting cone as well as the ring. The invention can greatly enhance the stability for operations and the precision of manufacturing dimensions, and the invention can be used extensively for various different machines and holders of existing specifications while providing stable operations of the machines and extending the life of the machines.

11 Claims, 7 Drawing Sheets

TOOL HOLDER STRUCTURE

This application is a Continuation-In-Part of application Ser. No. 11/263,905 filed on Nov. 2, 2205 now abandoned the entire contents of which are hereby incorporated by reference and for which priority is claimed under 35 U.S.C. § 120.

FIELD OF THE INVENTION

The present invention relates to a tool holder structure, and more particularly to a tool holder structure capable of installing a holder securely to a manufacturing machine.

BACKGROUND OF THE INVENTION

In general, a CNC machine is extensively used in a mechanical manufacturing field, and CNC machines can perform different manufacturing processes such as drilling, rolling, boring and milling a hole of a workpiece, and a milling cutter of the CNC machine is usually fixed onto the main shaft of the machine by a knife holder, and an inclined plane at the front end of the knife holder is used for holding and fixing the knife to the machine, so that the knife can be installed onto the machine.

The advantage of using an inclined plane resides on that it does not require a precise design of the knife holder to fit a knife of various different machines, and the tapered inclined plane is used for progressively sheathing the knife into the machine to hold and fix the knife automatically for a better installation condition. Therefore, such arrangement is applicable for different machines. Even if there is a discrepancy of the manufacturing precision of the machine or knife holder, the problem can be overcome easily, and the knife holder can be mounted securely onto the machine.

However, the machine and the knife holder of such design are held by the inclined plane of the knife holder only. Unless the machines and knife holders come with a special specification (which are usually expensive) that fit the design, the distal surface of the main shaft is not in contact with the knife holder, and the knife holder cannot truly press against the main shaft, such that when the machine is run, the knife holder will be shaken and the manufacturing precision will be affected adversely.

U.S. Pat. Nos. 5,352,073 and 6,739,810 disclose remedial measures for overcoming the shortcomings of the foregoing traditional designs, and present commercialized technologies also change the design of the holding position of the machine by adding a pressing portion protruded from the surface of the main shaft, such that when the knife holder is held, the pressing portion presses against the knife holder in a so-called "dual contact" fashion to improve the stability of the manufacture. However, this method changes the structure of the machine, and users have to send the machine to the original manufacturer for changing the components. Thus, manufacturers have to shut down the production line during the period of making changes to the machine, and thus causing tremendous trouble to manufacturers in addition to an increase of cost.

SUMMARY OF THE INVENTION

The primary objective of the present invention is to overcome the foregoing shortcomings and avoid the existing deficiencies by providing a tool holder structure that can achieve the effect of securely pressing the holder to the machine without changing the structure of the existing machine.

The tool holder structure according to a preferred embodiment of the present invention holds a tool by a holder, and the holder is installed at a connecting portion of a machine. The holder includes a connecting cone for connecting the connecting portion, and the bottom of the connecting cone has a latching portion with an external diameter larger than the connecting cone. The invention also installs a ring between the latching portion and a surface of the connecting portion for the latching portion to press the surface of the connecting portion to define a close connection, so that the holder is pressed and connected to the machine by both the connecting cone and the ring. Therefore, the invention can greatly enhance the stability of the operation of the machine and the precision of the manufacturing dimension, machines and holders of existing specifications while providing stable operations of the machines and extending the life of the machines.

DETAILED DESCRIPTION OF THE PREFERRED EMBODIMENTS

Figure 1:
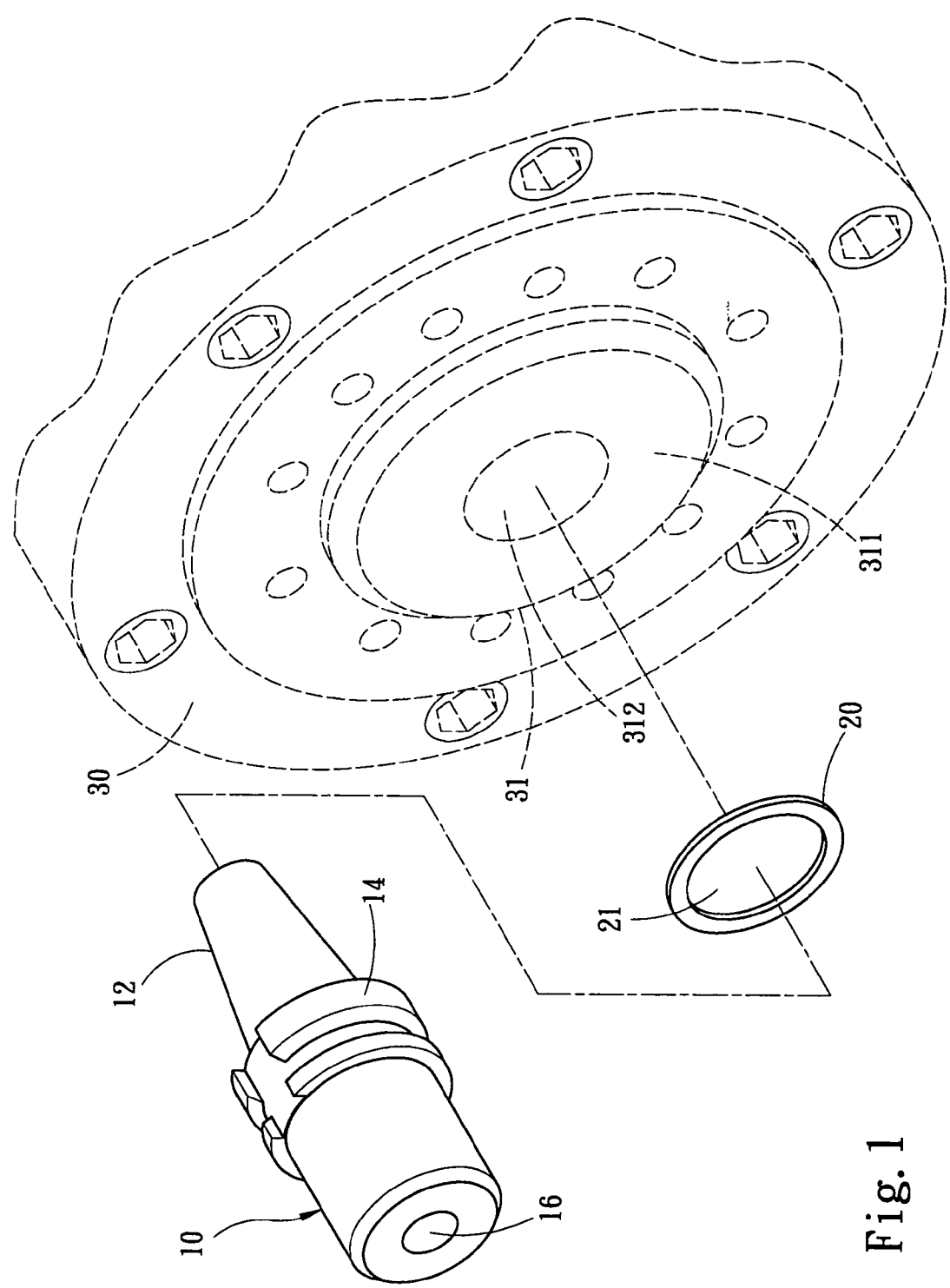
FIG. 1 is a diagrammatic view of the structure of a first preferred embodiment of the present invention.
Figure 2:
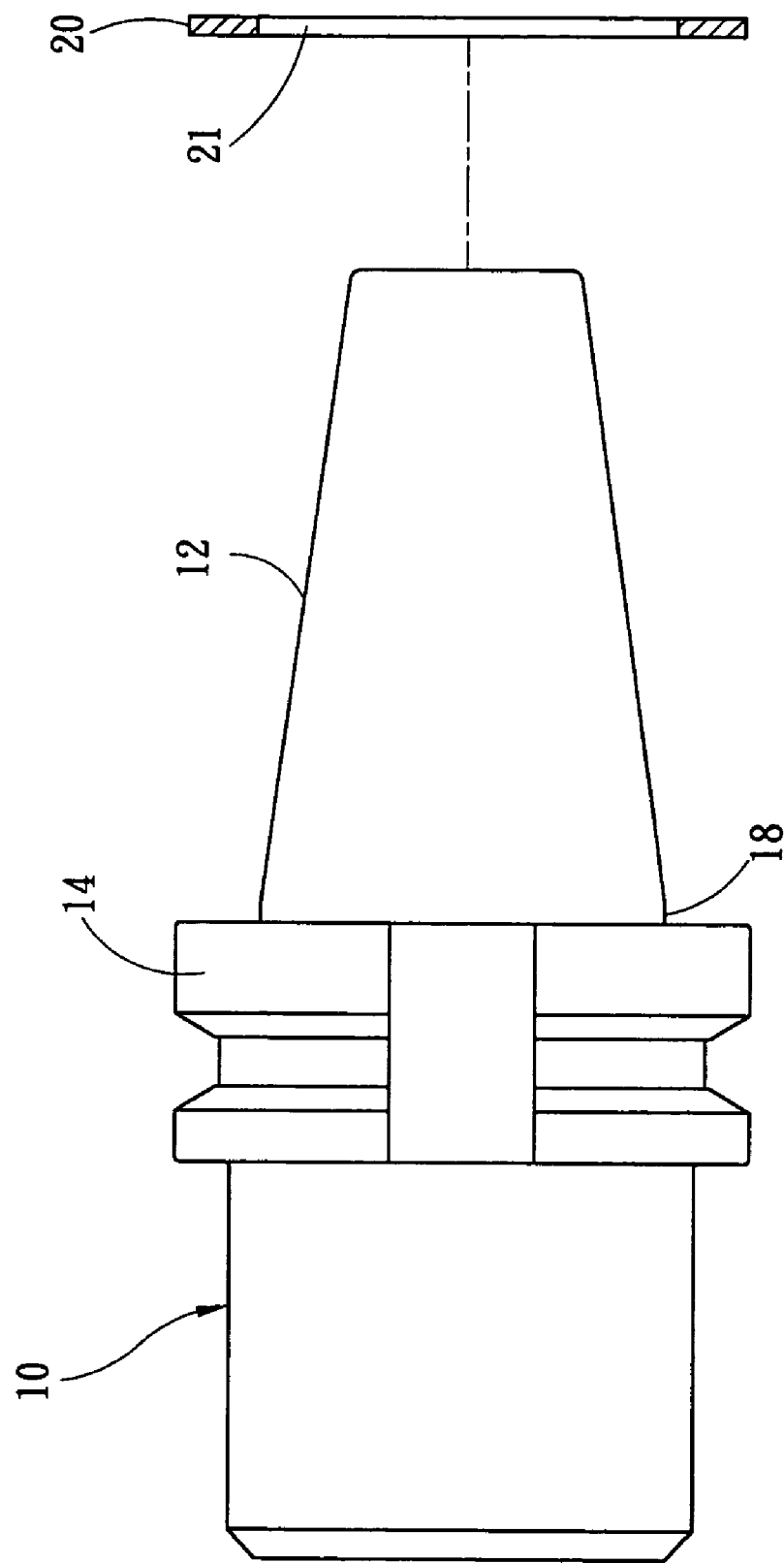
FIG. 2 is a planar view of the structure of a first preferred embodiment of the present invention.
Figure 3A:
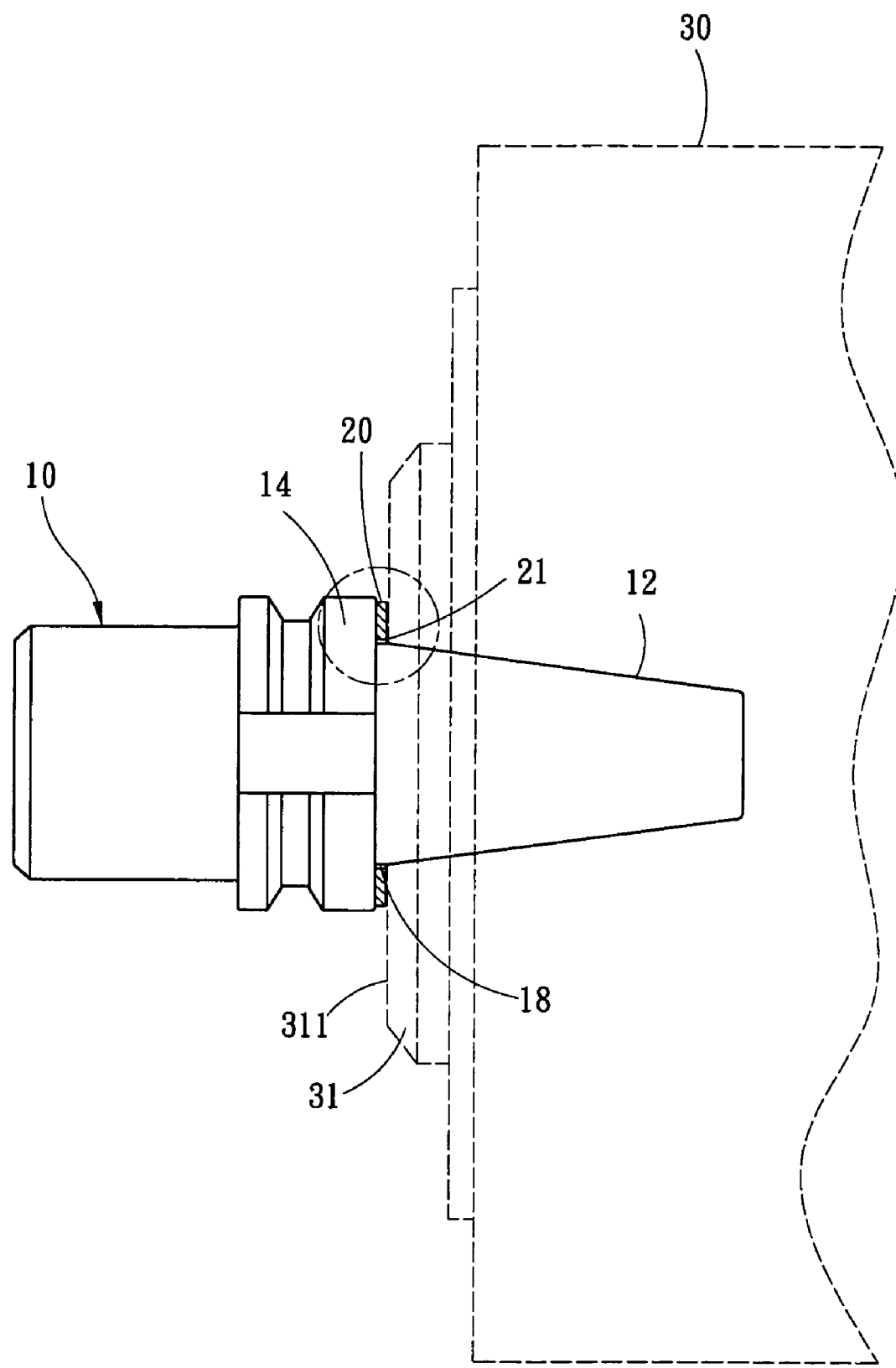
FIG. 3A is a schematic view of the structure of a first preferred embodiment of the present invention.
Figure 3B:
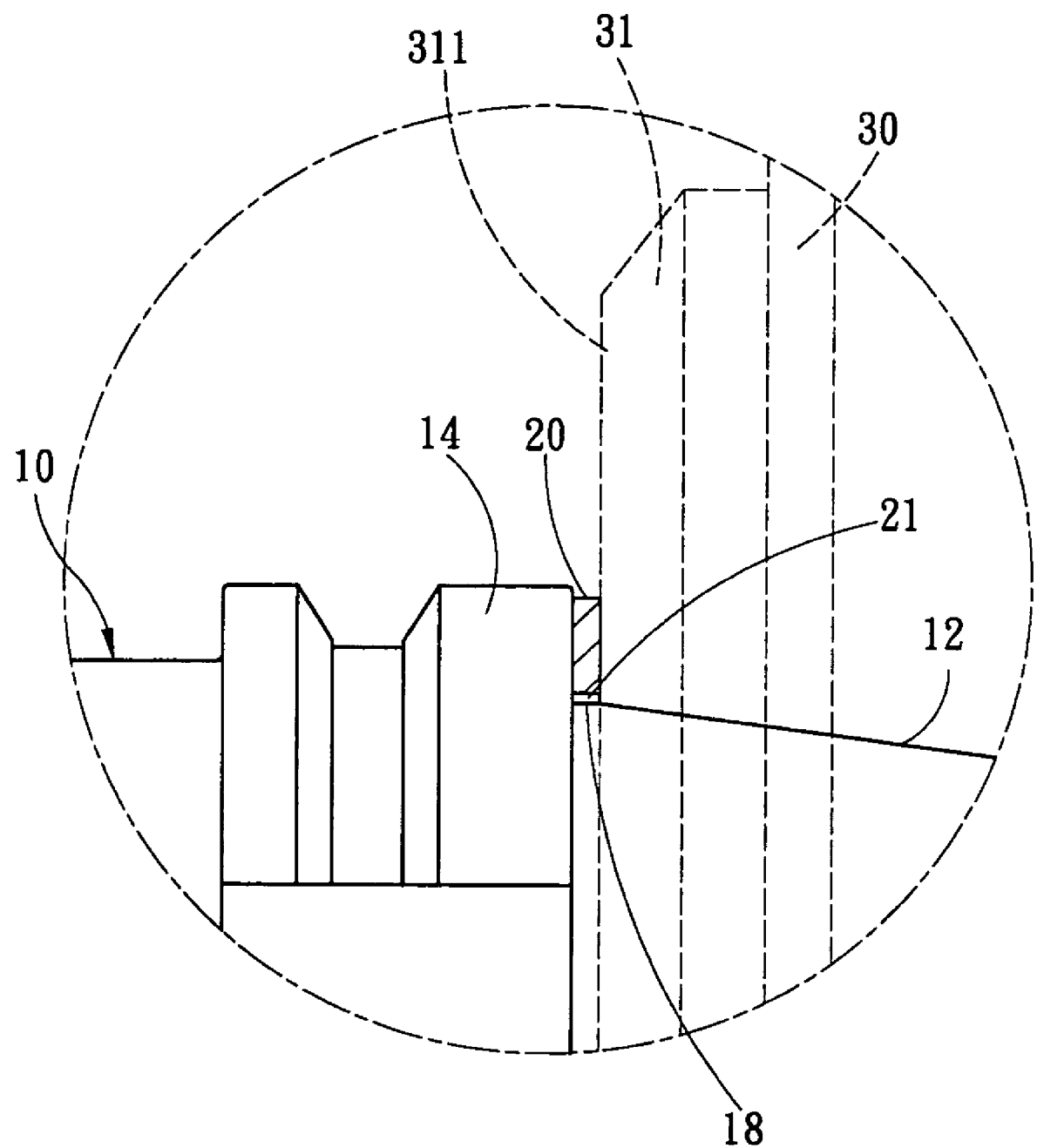
FIG. 3B is an enlarged view of a portion of the structure of a first preferred embodiment of the present invention.

The present invention will now be described in more detail hereinafter with reference to the accompanying drawings as follows:

Referring to FIG. 1 for the diagrammatic view of a structure of a first preferred embodiment of the present invention, the present invention relates to a tool holder structure that holds a tool (not shown in the figure) by a holder 10, and the holder 10 is installed on a connecting hole 312 of a connecting portion 31 of a machine 30, and the holder 10 has a connecting cone 12 for connecting the connecting hole 312, and the bottom of the connecting cone 12 has a latching portion 14 with an external diameter larger than the connecting cone 12, and the holder 10 has a positioning groove 16 for containing various different tools and knives such as a mill and a drilling head for a CNC machine. The invention further installs a ring 20 between the latching portion 14 and a surface 311 of the connecting portion 31, and the ring 20 is made of a metal (such as aluminum alloy) and the ring 20 has a through hole 21 for passing the connecting cone 12 and directly sheathing the connecting cone 12 onto the surface of the latching portion 14 (as shown in FIG. 2). The ring 20 also can be connected onto the surface of the latching portion 14 by a glue, so that the latching portion 14 can press against the surface 311 of the connecting portion 31 surface 311 by the ring 20 to define a close connection and the holder 10 can be connected to the surface 311 of the connecting portion 31 of the machine 30 by both the connecting cone 12 and the ring 20 (as shown in FIG. 3A). A parallel section 18 is disposed between the connecting cone 12 and the latching portion 14 for assuring the ring 20 to tightly press against the surface 311 of the connecting portion 31 of the machine 30, such that the ring 20 is connected closely with the latching portion 14 and the connecting portion 31, and the thickness of the ring 20 is equal to or greater than the length of the parallel section 18 (as shown in 3B).

Figure 4:
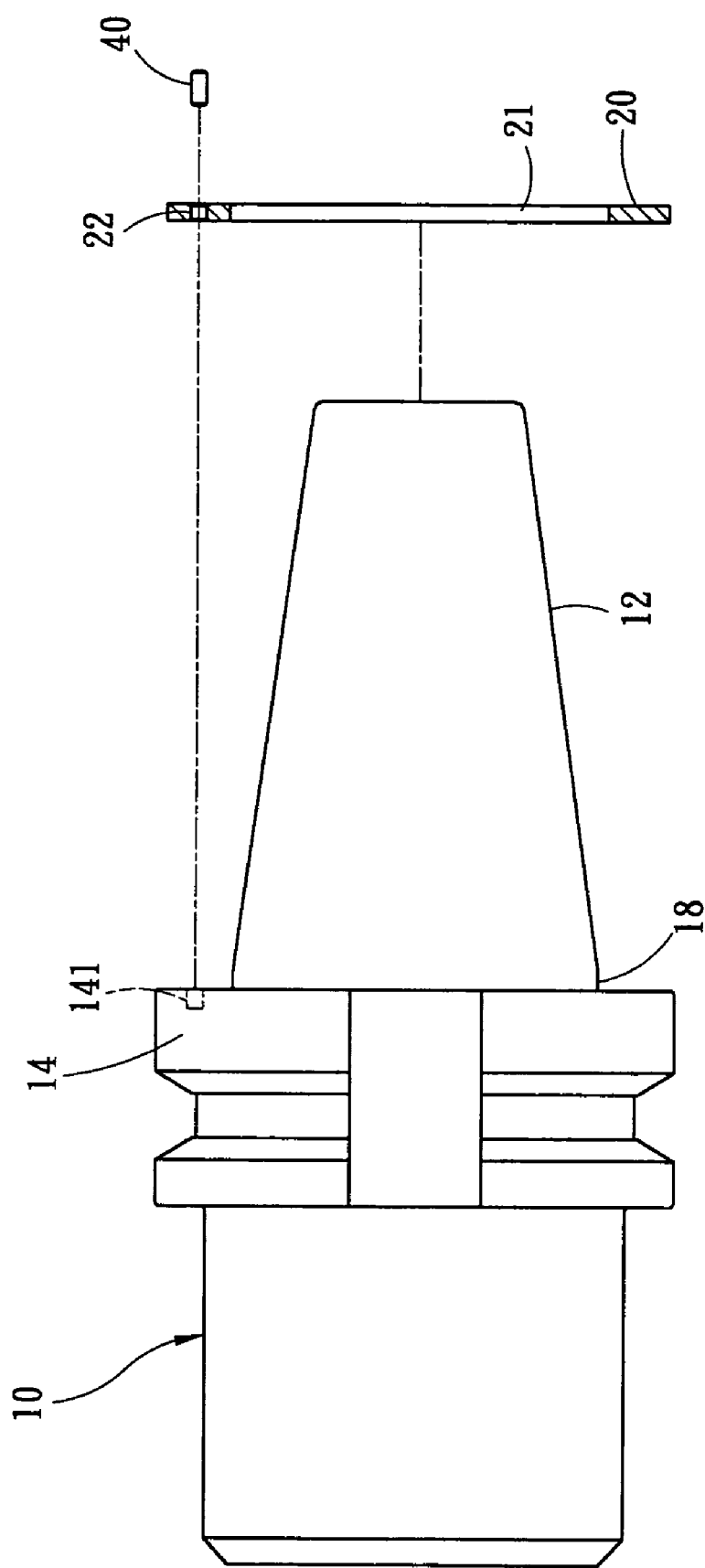
FIG. 4 is a schematic view of the structure of a second preferred embodiment of the present invention.
Figure 5:
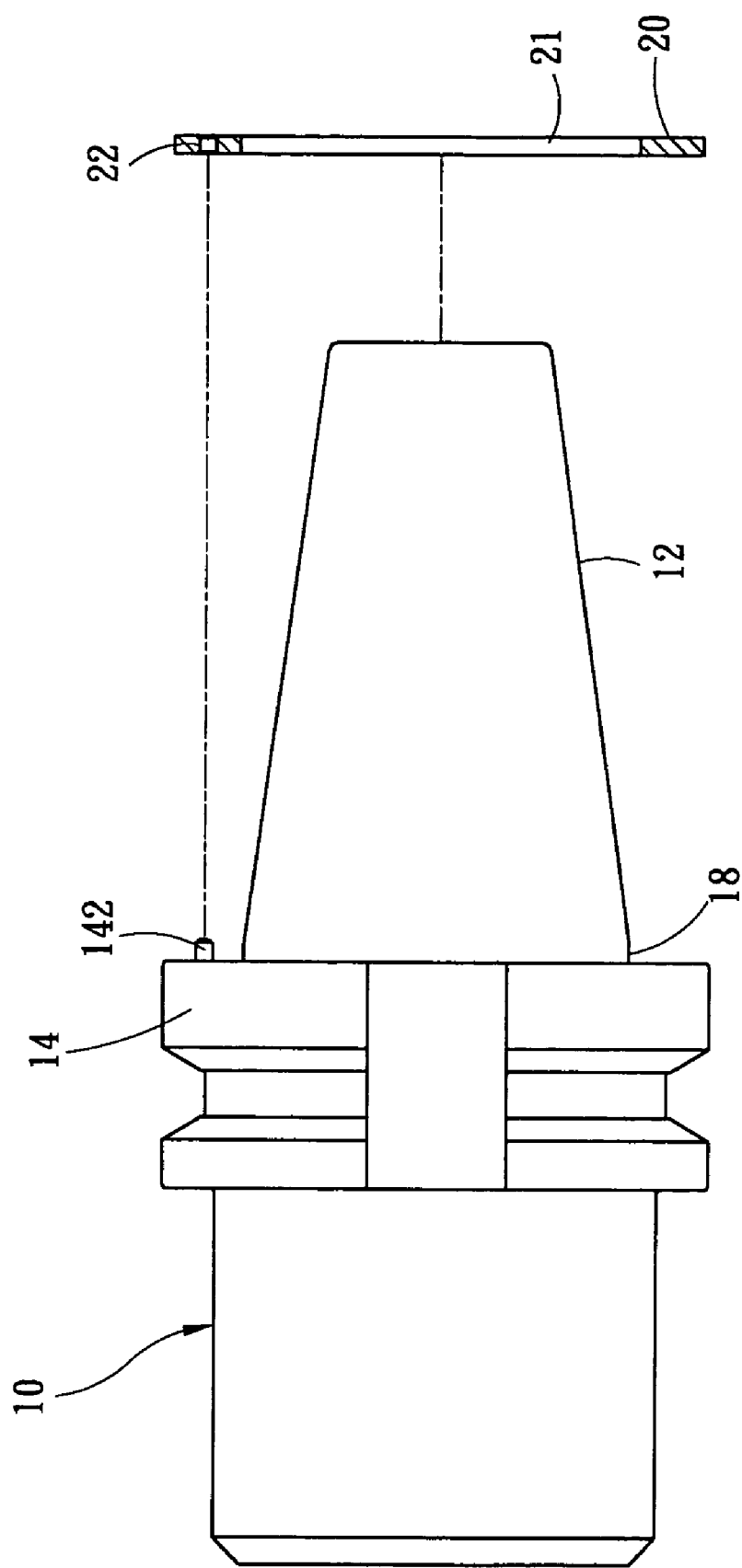
FIG. 5 is a schematic view of the structure of a third preferred embodiment of the present invention.
Figure 6:
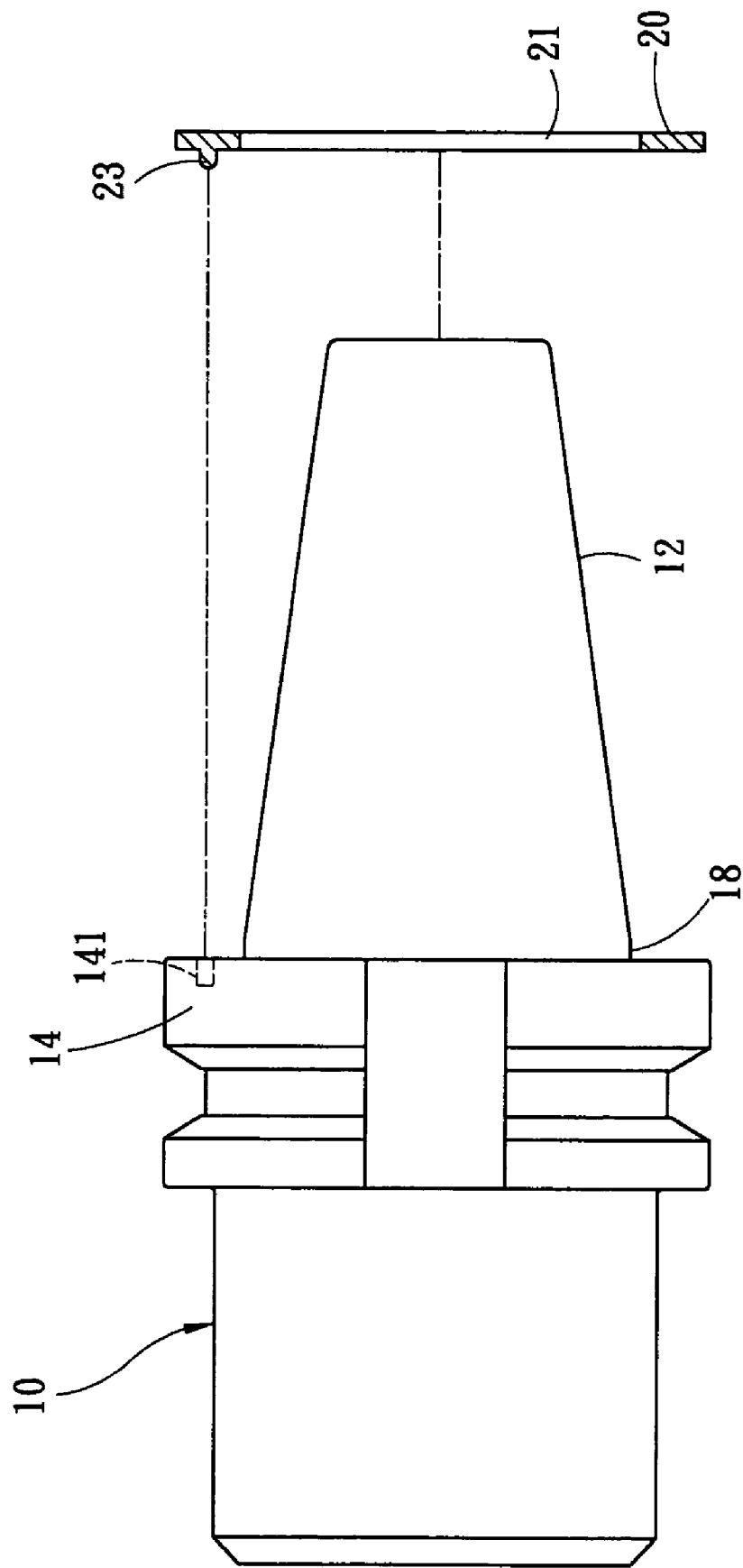
FIG. 6 is a schematic view of the structure of a fourth preferred embodiment of the present invention.

Referring to FIG. 4 for the schematic view of the structure of a second preferred embodiment of the present invention, the invention does not limit the way of connecting the ring 20 with the latching portion 14. In addition to the foregoing embodiment that sheathes the through hole 21 of the ring 20 to the connecting cone, a penetrating hole 22 also can be formed on the ring 20, and a positioning groove 141 can be formed on the surface of the latching portion 14, and a bolt 40 can be installed onto the penetrating hole 22 and the positioning groove 141 for defining a positioning relation for the ring 20 and the latching portion 14. The ring 20 also can come with a penetrating hole 22, and the surface of the latching portion 14 has a positioning protrusion 142 passing through the penetrating hole 22 (as shown in FIG. 5), or the ring 20 has a fixing portion 23 protruded from the surface of the ring 20, and the latching portion 14 has a positioning groove 141 for containing the fixing portion 23 into the positioning groove 141 (as shown in FIG. 6). All of the aforementioned arrangements can provide a better positioning relation for the ring 20 and the latching portion 14.

In summation of the description above, the present invention installs a ring 20 between the latching portion 14 and the surface 311 of the connecting portion 31 for pressing and connecting the latching portion 14 to the surface of the connecting portion 31 by the ring 20, such that the holder 10 can be connected to the machine 30 by the connecting cone 12 as well as the ring 20. Therefore, it is not necessary to change the user's existing machine to improve the stability of the operations of the machine and the precision of manufacturing dimensions and provide a stable operation of the machine and extend the life of the machine.

While the invention has been described by means of specific embodiments, numerous modifications and variations could be made thereto by those skilled in the art without departing from the scope and spirit of the invention set forth in the claims.

What is claimed is:

1. A tool holder structure, having a holder installed on a connecting portion of a machine for fixing a tool, and said holder having a connecting cone for connecting said connecting portion and a latching portion with an external diameter larger than said connecting cone disposed at the bottom of said connecting cone, the connecting cone having a tapered end, a parallel section being provided between the tapered end and the latching portion, and a metal ring being installed between said latching portion and a surface of said connecting portion to define a tight engagement of said latching portion with the surface of said connecting portion, a width of the metal ring being at least equal to a width of the circumferential section and the metal ring engages a face of the latching portion.

2. The tool holder structure of claim 1, wherein said ring includes a through hole for passing said connecting cone.

3. The tool holder structure of claim 1, wherein said metal is an aluminum alloy.

4. The tool holder structure of claim 1, wherein said ring is glued onto the surface of said latching portion.

5. The tool holder structure of claim 1, wherein said ring has a penetrating hole thereon, and the surface of said latching portion has a positioning groove, said penetrating hole and said positioning groove installs a bolt for defining a positioning relation for said ring and said latching portion.

6. The tool holder structure of claim 1, wherein said ring has a penetrating hole thereon, and said surface of said latching portion has a positioning protrusion passing into said penetrating hole.

7. The tool holder structure of claim 1, wherein said ring has a fixing portion protruded from the surface of said ring, and said latching portion has a positioning groove for accommodating said fixing portion into said positioning groove.

8. The tool holder structure of claim 1, further comprising a parallel section disposed between said connecting cone and said latching portion, and the thickness of said ring is equal to or greater than the length of said parallel section.

9. The tool holder structure of claim 1, wherein the ring is detachable from the connecting cone and the latching portion.

10. The tool holder structure of claim 1, wherein the ring is readily detachable from the connecting cone and the latching portion and wherein the ring directly engages and is between the surface of the connecting portion and the latching portion.

11. The tool holder structure of claim 1, wherein an outer surface of said parallel section has a uniform circumference throughout.

* * * * *